US010667121B2

(12) United States Patent
Tang et al.

(10) Patent No.: US 10,667,121 B2
(45) Date of Patent: May 26, 2020

(54) CONTROL OF SELF-ORGANIZING NETWORK FUNCTIONS

(71) Applicant: Nokia Solutions and Networks Oy, Espoo (FI)

(72) Inventors: Haitao Tang, Espoo (FI); Kaj Peter Stenberg, Sundsberg (FI)

(73) Assignee: Nokia Solutions and Networks Oy, Espoo (FI)

( * ) Notice: Subject to any disclaimer, the term of this patent is extended or adjusted under 35 U.S.C. 154(b) by 99 days.

(21) Appl. No.: 15/542,178

(22) PCT Filed: Jan. 9, 2015

(86) PCT No.: PCT/EP2015/050316
§ 371 (c)(1),
(2) Date: Jul. 7, 2017

(87) PCT Pub. No.: WO2016/110330
PCT Pub. Date: Jul. 14, 2016

(65) Prior Publication Data
US 2018/0338239 A1 Nov. 22, 2018

(51) Int. Cl.
*H04W 8/08* (2009.01)
*H04W 4/80* (2018.01)
*H04W 24/02* (2009.01)

(52) U.S. Cl.
CPC ............... *H04W 8/08* (2013.01); *H04W 4/80* (2018.02)

(58) Field of Classification Search
CPC ......... H04W 8/08; H04W 4/80; H04W 24/02; H04L 41/0806; H04L 41/085
(Continued)

(56) References Cited

U.S. PATENT DOCUMENTS 7,065,353 B1* 6/2006 Bolinth ............. H04W 36/0088
455/426.1
2010/0005124 A1* 1/2010 Wagner ................... G06F 16/27
707/E17.005
(Continued)

FOREIGN PATENT DOCUMENTS

CN 102056206 A 5/2011
CN 102724691 A 10/2012
(Continued)

OTHER PUBLICATIONS

3GPP TS 28.628 v12.0 1.o (Dec. 2014) (Year: 2012).*
(Continued)

*Primary Examiner* — Inder P Mehra
(74) *Attorney, Agent, or Firm* — Harrington & Smith (57) ABSTRACT

In an example, a mobile network apparatus is configured to operations support systems, OSS, including at least one processor, and at least one memory storing program instructions that, when executed by the at least one processor, cause the apparatus to: request, by a coordination function of the OSS, information relating to an uncoordinated function or an instance of an uncoordinated function, wherein the uncoordinated function or the instance of the uncoordinated function is related to the coordination function; receive, by the coordination function, a response including the information; based on the response, control, by the coordination function, the uncoordinated function or the instance of the uncoordinated function. In other examples, a method and a computer program product have been discussed along with the features of the mobile network apparatus.

20 Claims, 3 Drawing Sheets (58) Field of Classification Search
USPC .............................................. 455/403, 414.3
See application file for complete search history.

(56) References Cited

U.S. PATENT DOCUMENTS

| | | | | |
|---|---|---|---|---|
| 2014/0337490 A1 | 11/2014 | Zhao et al. | ................... | 709/220 |
| 2015/0026235 A1* | 1/2015 | Chaintreau | ........... | H04L 67/104 |
| | | | | 709/202 |

FOREIGN PATENT DOCUMENTS

| | | | | |
|---|---|---|---|---|
| CN | 104040948 A | | 9/2014 | |
| EP | 2 410 783 A1 * | | 1/2012 | ............ H04W 24/02 |
| EP | 2 453 691 A1 | | 5/2012 | |
| WO | WO-2013/071965 A1 | | 5/2013 | |
| WO | WO-2013113266 A1 | | 8/2013 | |
| WO | WO 2014/198310 A1 * | | 12/2014 | ............ H04W 24/02 |

OTHER PUBLICATIONS

Ben Jemaa, Sana, et al., "D5.1 SEMAFOUR Integrated SON Management Requirements and Basic Concepts", Dec. 13, 2013, SEMAFOUR (316384), 50 pgs.

3GPP TS 28.628 V12.1.0 (Dec. 2014), "$3^{rd}$ Generation Partnership Project; Technical Specification Group Services and System Aspects; Telecommunication management; Self-Organizing Networks (SAN) Policy Network Resource Model (NRM) Integration Reference Point (IRP); Information Service (IS) (Release 12)", 57 pgs.

"Service-oriented cross-layer infrastructure for distributed smart embedded systems", https://cordis.europa.eu/project/id/034116; Feb. 9, 2009, 4 pages.

"Semafour Self-Management f Unified Heterogeneous Radio Access Networks", https://web.archive.org/web/20140704103841/http://www.fp7-semafour.eu/, Jul. 4, 2014, 1 page.

\* cited by examiner

CONTROL OF SELF-ORGANIZING NETWORK FUNCTIONS

BACKGROUND

A self-organizing network, SON, is an automation technology designed to make planning, configuration, management, optimization and healing of mobile radio access networks simpler and faster. SON functionality and behavior have been defined and specified in generally accepted mobile industry recommendations produced by organizations such as 3rd generation partnership project, 3GPP, and the next generation mobile networks, NGMN. One of the promise of SON may be considered to operations support systems, OSS, or operational support systems in British usage, which are computer systems used by telecommunications service providers to manage their networks. OSS support management functions, such as network inventory, service provisioning, network configuration, performance and fault management, CM, PM and FM.

There are a number of individual functions, SON functions or non-SON functions, working in the network elements of a real network, for example in long term evolution, LTE, network. Many of these functions do their work, for example monitoring, making a decision, changing certain parameter of a network element, etc., themselves without any consulting to and instruction or permission from an OSS function (a function of an OSS), once enabled. These functions usually react to quick changes in their very limited network scope, in real time.

If a function changes some parameter of a network element, the change could be notified instantly to the OSS function. For example, the configuration management, CM, history entity, for example CM history tabular reports, at OSS side has the information of a configuration action, which is made by a function locally working at a network element. However, the other OSS functions, including the GUI for human operator in a network operations center, do not have this change information directly. For example, a coordination function working at the OSS does not have this information of the changed function, if the function is not under its direct coordination. Examples of functions which may not be under direct coordination of an OSS are mobility load balancing, MLB, distributed mobility robustness, d-SON MRO, enhanced inter-cell interference coordination, eICIC, circuit switched fall back, CSFB, single radio voice call continuation, SRVCC, and service based handover, SBHO.

SUMMARY

This summary is provided to introduce a selection of concepts in a simplified form that are further described below in the detailed description. This summary is not intended to identify key features or essential features of the claimed subject matter, nor is it intended to be used to limit the scope of the claimed subject matter.

In one example, a mobile network apparatus is configured to operations support systems, OSS, comprising: At least one processor, and at least one memory storing program instructions that, when executed by the at least one processor, cause the apparatus to: request, by a coordination function of the OSS, information relating to an uncoordinated function or an instance of an uncoordinated function, wherein the uncoordinated function or the instance of the uncoordinated function is related to the coordination function; receive, by the coordination function, a response comprising the information; and based on the response, control, by the coordination function, the uncoordinated function or the instance of the uncoordinated function.

In other examples a method and a computer program product have been discussed along with the features of the mobile network apparatus.

Many of the attendant features will be more readily appreciated as they become better understood by reference to the following detailed description considered in connection with the accompanying drawings.

DESCRIPTION OF THE DRAWINGS

The present description will be better understood from the following detailed description read in light of the accompanying drawings, wherein.

Like references are used to designate like parts in the accompanying drawings.

DETAILED DESCRIPTION

The detailed description provided below in connection with the appended drawings is intended as a description of the present examples and is not intended to represent the only forms in which the present example may be constructed or utilized. However, the same or equivalent functions and sequences may be accomplished by different examples.

Figure 1:
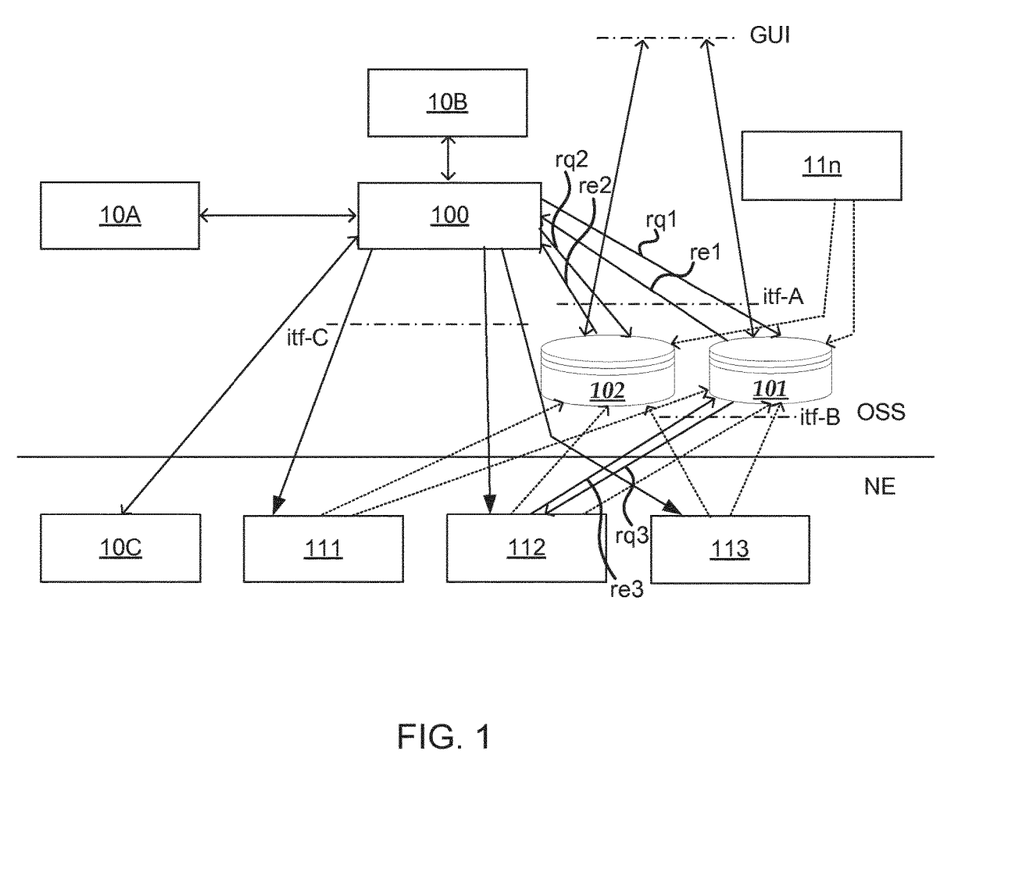
FIG. 1 illustrates architecture for OSS functions, in accordance with an illustrative example.
Figure 2:
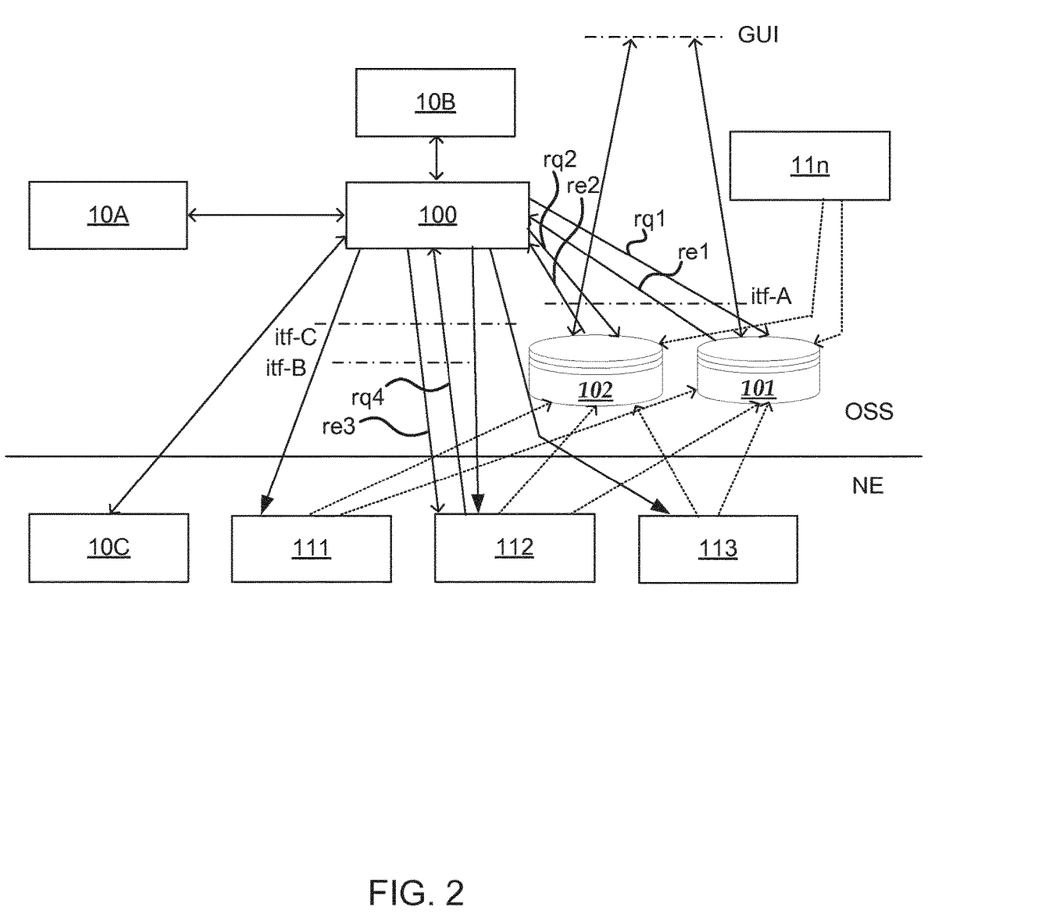
FIG. 2 illustrates architecture for OSS functions, in accordance with an illustrative example.

FIGS. 1 and 2 illustrate an example of a mobile architectural model. Although the present examples may be described and illustrated herein as being implemented in OSS SON network types, these are merely examples of network functions and not a limitation. As those skilled in the art will appreciate, the present examples are suitable for application in a variety of different types of network functions and apparatuses. Related examples and figures about specific functions are applicable also for other architectures.

FIGS. 1 and 2 include a coordination function 100, which is connected to and controls coordinated functions A, B and C (10A, 10B, 10C). The coordination function 100 is configured to control uncoordinated functions 111,112,113, for example as discussed in examples. ACM data 102 and a CM history 101 databases are connected to the coordinated function 100 by request and response messages. The CM history database 101 may be connected to the uncoordinated function 112 by request—response messages. Furthermore, the CM data 102 and the CM history 101 databases are connected to the uncoordinated functions 111,112,113 causing updates directly or indirectly. Interfaces itf-A, itf-B and itf-C are shown in the examples, and a graphical user interface GUI for user control is shown.

In a real network, many of the local functions, for example, many D-SON functions, are not coordinated by a coordination function 100. These uncoordinated functions 111,112,113 may still interact between themselves and with the coordinated functions 10A,10B,10C. However, there may be different kinds of conflicts. Due to the limitation of scalability and various real restrictions, the coordination function 100 may not and cannot manage all the network functions under its direct coordination. The coordination function 100 may at least have information about what has been done by the uncoordinated functions 111,112,113. By utilizing such information for the coordination, the coordination function 100 may coordinate its coordinated functions 10A,10B,10C correctly and drive the network operation with the network-wide consistency.

In an example relating to a OSS function, the coordination function 100, requests specific information of an uncoordinated function 111,112,113 quite instantly for the decision making and the action taking process of the OSS function. The example may enable a specific control of an uncoordinated function 111,112,113 quite instantly by the coordination function 100. The example defines what information of a function, especially the uncoordinated function 111,112, 113, should be made available for the OSS function, such as the coordination function 100. The example also discusses where and how such information may be collected. Examples of three interfaces itf-A, itf-B, and itf-C are also illustrated in the FIGS. 1 and 2.

According to an example, information, which is required by the coordination function 100, is configured to be extracted from a configuration management, CM, plan, a CM activation record, and a status record of a given function. Examples of the CM plan, the activation record, and the status of the function are discussed and include various information elements.

However, during a network operation, there are quite often information elements, whose values are missing in the corresponding activation record. This is typically the case for an uncoordinated function 111,112,113. Especially, in case of distributed SON functions, the information element identifying the originating function or the originating reason may not exist. Consequently, an example also defines two additional information elements, in a CM activation record definition, which are required in order to identify distributed SON functions explicitly. The status of the function instance definition has a similar situation, in that additional information is added to it, in an example. Furthermore, the CM plan if applied, the activation record, and the status of the function are usually not kept in the same information storage. Consequently, an example relates to extract all required information elements, as well as their values, so that required information can be made available for a coordination function 100.

Examples of the information elements required for the control are extensions, which are made based on the information elements for the CM plan, the CM activation record, and the status of the function instance that has initiated the CM. Examples are discussed below one by one.

An example of a CM plan can have the information elements as shown in a Table 1. The CM plan includes a plan name, a plan ID, a timestamp of plan creation and a plan content.

TABLE 1

| Plan Name | string | For example, d-SON coordination plan. |
|---|---|---|
| Plan_ID | num | Identifier of the plan. |
| Timestamp of Plan Creation | Date, time | Date and time when the plan was created. |
| Plan Content | String, list | List of managed object, MO, distinguished name, DN for Cells - MO class, abbreviated name. |

An example of a CM activation record of a CM action may contain the information elements shown in a Table 2. The CM activation record includes a managed object, MO, distinguished name, DN, a timestamp, change origins, a parameter name, an old value, a new value, and a context. They may be similar to what have been defined for a record of a CM history file. The change origin includes means configured for requesting and controlling the uncoordinated function such as SON function instance, SFI, identification, ID (SFI_ID) and a unique ID of the entry for a given SFI. SFI_ID is configured to identify a function. SFI_ID and entryID together are configured to identify a specific instance of the function. According to an example there may be two kinds of levels, a function level and its instance level. A function may be enabled well before any potential instance of this function is instantiated. At this function level, the status information of the function may be enabled or disabled. The operation of the function may be of the configuration of the function. A function may be instantiated into one or more instances of this function. At this instance level, the operations, impacts, status, etc. of the instances are only specific to the very instances of the function.

TABLE 2

| Managed Object, MO, Distinguished Name, DN | string | Identifies the MO, where CM change has been executed, as the MO DN element of the record. Available via a CM history file. |
|---|---|---|
| Timestamp of CM activation | dateTime | Date and time of the entry creation, as the timestamp element of the record. Here, the entry can be created by the activation of a CM plan or by an object that made the autonomous CN changes. Can be taken from a CM History file. |
| Change Origin: SFI_id | String | SON function, SFI_ID (a part of the key or the tag), as a part of the change origin element of the record. Required for identification of a SON operation, for example MLB or eICIC. Once parameter change is executed in NE, it should record the change into the CM history file. |
| Change Origin: entryId | Int | Unique ID of the entry for a given SFI (a part of the key or the tag), as a part of the change origin element of the record. May be possibly, equal or the same ID as the Plan_ID. May be required as there can be parallel SFIs executed with the same type, for example SFI_id. |

TABLE 2-continued

| Parameter name | string | Available in a CM history file, as the parameter name element of the record. Shows the exact parameter name, which has been changed by a function. |
|---|---|---|
| Old value | String, Boolean, number | Available in a CM history file, as the old value element of the record. Shows parameter's old value before changed by a function For future use or optional: May not be needed in this context, but might give some indication why and how much some value has been changed in case this is needed as an input for some further analysis. |
| New value | String, Boolean, number | As above, as the new value element of the record. Shows parameter's new value after changed by a function |
| Context | | Free form of info, which an operator or a function may insert. |

An example of a status of the function instance, alternatively referred to as a status record, is discussed next. The status record provides the operational information of a function instance, which would be kept in the CM data 102 database as shown in FIG. 1 and FIG. 2. A status record contains the following information elements as shown in a Table 3.

TABLE 3

| Managed Object Distinguished Name, MO DN | string | Identifies the MO, where CM change has been executed, as the managed object DN element of the record. Available via a CM history file. |
|---|---|---|
| MO class, abbreviated name | string | disabled/deactivated, enabled/activated, impactIsOn, and impactIsOff Can be extracted from a CM database interface. It is needed to switch between enable/disable as well as, between impactIsOn and impactIsOff. |
| Impact area | string[ ] | Source cell, the list of target cells, and/or any relevant information object names. For example, d-SON operations are locally executed, for example, the impact area covers most likely a certain cell plus its neighboring cells. MO DN, from a CM history file, correlated against the CM database to discover the source cell, adjacency list from CM database. |
| Impact time | String[ ] | The impact time period. For example, it may be as such; off, on, start at <UTC>, end at <UTC>, between <UTC1 and UTC2> |

An example relates to extract the required information elements and their values.

The extraction of the CM plan of a function instance, which is related to the given impact information, may be as follows. The extraction is made by the procedure defined for an interface, itf-A, below, with the CM history database 102 or the respective file.

The extraction of the status of the function instance may be as follows. The missing information can also be the current status related to the CM plan. It may simply be the CM action, for example the current status of the uncoordinated function 111,112,113, which made the CM activation. It may also be the impact of the CM activation and the function.

The extraction of the CM activation records of the function instance may be as follows. There are two general examples to extract the information.

In the first example, if a SON function is directly managed by an OSS function, an extraction can be made by the OSS function itself or by a user operating the OSS. When a new CM plan is activated, the changes in comparison to the previous CM plan, such as the actual plan, are recorded in a CM activation record. The CM activation record is stored into the CM history 101 database for access. As the new CM plan contains certain identification, the CM changes and especially the originator, or a reason for triggering these changes, are easy to trace from the CM history database 101 file. For example as shown in the example of Table 4.

In the second example, if a SON function (for example an uncoordinated function 111,112,113 such as a distributed SON function) makes autonomous operations locally, without the direct management via an OSS the CM activation record of this function will have some information elements without values being provided. The change caused in the CM will be recorded in the CM history file without the information of why or by whom, for example in this case by which automated local SON operation, the CM change was made. In this example, the missing information should be extracted by one of the alternatives as illustrated in FIG. 1 and FIG. 2.

FIG. 1 illustrates an example for extracting missing information. The CM history database 101 receives a CM activation record, wherein some of the record's information elements are empty without a value. An information checker for CM history database 101 detects this missing element.

The information checker or the CM history database 101 sends a request rq3 to relevant function instances for the missing information. This is processed with a procedure defined in an example of the interface itf-B. The corresponding function instance sends a response re3 with the missing information. This is based on using a procedure defined in the example of the interface itf-B. This alternative makes the activation records in the CM history database 101 nearly always complete for the use. However, many of its activation records would not be used by the coordination function, which may lead to a waist of processing resources.

FIG. 2 illustrates another example for extracting missing information. An OSS function, for example the coordination function 100, detects that there is a CM change relevant to the coordination. This may be after using the itf-A procedure. However, this CM change has been recorded as the activation record without enough information in the CM history database 101 or the file. The coordination function 100 then directly sends a request rq4 to all relevant uncoordinated functions 111,112,113 for the missing information element value(s) of the CM activation record, on demand. The uncoordinated function 112, which made the corresponding CM activation, shall send a response re4 to the OSS function 100. The response re4 may be preferably made with the full information values. For example, the missing information can be the origin of the change or the cause of the change, etc. This example may prevent the unnecessary processing overhead for the CM history database 101. The example may add a bit extra load and delay for the requesting OSS function.

An example relates to an interface, itf-A. ltf-A is shown in FIGS. 1 and 2 between the coordination function 100 and the CM history database 101. The interface itf-A is defined for an OSS function, for example a coordination function 100. The interface itf-A is configured to send a request rq1 to the CM history database 101 for the CM activation record and, if any, the relevant CM plan. The coordination function 100 sends a request rq1 to the CM history database 101. The request rq1 includes an impact area and optionally an impact time. The impact area and the impact time may be based on the status function instance. The CM history database 101 sends a response re1 to the coordination function 100. The response re 1 includes the CM activation record and optionally the CM plan. The CM activation record and the CM plan are related to the given impact area. The interface itf-A is further defined for an OSS function 100 to send a request rq2 the CM data database 102 for the status information of a relevant CM activation or the relevant function, which either made the CM activation or relates to the given impact area. The coordination function 100 sends a request rq2 to CM data database 102. The request rq2 includes a managed object DN. The request rq2 may include an impact area, and optionally an impact time. The managed object DN, the impact area, and the impact time may be based on the status of the function instance. The CM data database 102 sends a response re2 to the coordination function 100. The response re2 may include a status of managed object DN. The response re 2 may include one or more statuses of managed object DNs, which are relevant to the impact area and optionally to the impact time.

An example relates to an interface itf-B. Itf-B is shown in FIGS. 1 and 2. The interface Itf-B is defined for an OSS function, for example a coordination function 100. The interface itf-B is configured to request relevant uncoordinated functions for the missing history information of a CM activation. In an example the CM history database 101 sends a request re3 to the relevant uncoordinated function 112. In another example the coordination function 100 sends a request re3 to the relevant uncoordinated function 112. The request re3 includes a parameter name and a new value of the parameter. The uncoordinated function 112, which is requested and has changed the given parameter with the given value before, sends a response re3. The response includes a managed object DN, a timestamp of the CM plan or a request creation, a change origin, and optionally a change cause. The response re3 may be sent to the CM history database 101 or to the coordination function 100.

An example defines an interface itf-C. ltf-C is shown in FIGS. 1 and 2. The interface itf-C is defined for an OSS function, for example the coordination function 100, in order to control an uncoordinated function 111,112,113. ltf-C is used to control the uncoordinated function 111,112,113. For example, the coordination function 100 performs an operation to the uncoordinated function 112. The operation may be sending a command. The operation includes a managed object DN, and an enable/disable or activate/deactivate or impactupdate value as in the status of the function instance. Optionally, the uncoordinated function, or possibly another function, may issue a notification, which includes the managed object DN, and an enabled/disabled or activated/deactivated or impactupdated value. According to an example, the impactupdate may intend to change the impact information of the uncoordinated function 111,112,113, which takes the value of the impactison or impactisoff.

The interfaces itf-A, itf-B, and itf-C may be implemented as a logical interface. For example, the interface itf-C between a coordination function 100 and the uncoordinated function 112 may be logical interface, and not as the physical interface between the coordination function 100 and a network element, NE. The physical interface may be realized between a SON coordinator and a CM database. For example with a plan provisioning, which plan is created by a SON coordinator, uncoordinated functions can be enabled/disabled for a certain group of network elements, wherein the group may be a list of MO DN.

Table 4 below illustrates an example, which contains two CM activation records in its first and second entry. Each entry represents a certain parameter value change as recorded in a CM history file. The change origin data field tells by whom or for what reason the change has been executed. As can be seen in the first entry, there is no information about the change origin—the most likely conclusion is that this change has been triggered by an uncoordinated function 111,112,113. On the contrary, the second entry shows, that the other CM change has been executed with a CM plan (prefix: InterRAT_ANR_GERAN, planid: 1564, date: 08.01.2014) via an OSS in a coordinated way, for example by coordination function 100. This execution has taken place either manually by the user, instantly or scheduled. This execution may have also been automatically triggered by the system based on certain criteria, for example an event based triggering. For example, it may be detected that the change was done by a coordinated SON operation, which is called as InterRAT_ANR_GERAN at 8.1.2014 12:14. It may also have other information, for example a reason or a cause of such a CM change, which can be kept by the context element of the entry.

TABLE 4

| Managed Object DN | Timestamp of Plan Avtivation | Change Origin | Parameter Name | Old Value | New Value | Change type | Context |
|---|---|---|---|---|---|---|---|
| PLMN-PLMN/M RBTS-435/LNBTS-435/LNCEL-1 | 8.1.2014 12:04 | | threshold2a | notUsed | 33 | update | |
| PLMN-PLMN/M RBTS-813/LNBTS-813/LNCEL-2 | 8.1.2014 12:14 | InterRAT_ANR_GERAN_1564_08.01.2014 | threshold2GERAN | 32 | 22 | | |

In the example, wherein the change origin is not known, it can be assumed that the change has been caused by an uncoordinated function 111,112,113. The next step is to identify by which function. This could be done by exploring the CM database 101,102 with a certain managed object distinguished name, DN, in order to check, if there are any uncoordinated SON functions enabled or activated locally in the network elements, for example LNBTS or LNCEL. This query may return, for example, that there are d-SON functions, for example MLB and eICIC, enabled in that certain managed object. Despite of that, a 100% confidence can never be reached that the CM change was particularly caused by a certain uncoordinated SON function, as there is currently no linkage from the parameter name back to a certain function—it is impossible to say by which function that certain parameter has been changed. However, this has significantly reduced the number of requests that, for example, a coordination function 100 would need to send to the uncoordinated functions 111,112,113 over the interface itf-B. However, the query helps the OSS, a SON coordinator, to understand, which distributed SON functions there are active in certain region and, in case these are considered conflicting with the other SON operations, to switch them off, or disable them, for a certain period of time for example.

An example relates to a solution, wherein the uncoordinated SON function 111,112,113, is configured to report into the CM history file the change origin information by SFI_id as in the CM activation record, for example by service based handover, SBHO. Consequently, the interface itf-B is applied to request for the information and convey the response.

According to the example, the configuration to extract all those information elements, and their values, makes an uncoordinated function 111,112,113 able to provide a missing value of a CM cause, or origin, information element, such as the change origin, to a coordination function 100. Consequently, the coordination function 100 is convenient to check what SON functions are there overlapping in an impact area and time. For example, based on a SON conflict matrix, the coordination function 100 may check, if they conflict with each other. If so, the coordination function 100 may correspondingly trigger certain collision avoidance actions, for example, to disable an uncoordinated SON function 111,112,113 for a certain period of time. In another case, a coordinated SON function 111,112,113 might be disabled for a d-SON function to take action first.

In the examples, the mobile network apparatus configured to the OSS may be providing communications to the UE. UE may be in a form of a smartphone, and as discussed other mobile devices may be used equivalently, such as tablet computers, netbook computers, laptop computers, desktop computers, processor-enabled televisions, personal digital assistants (PDAs), touchscreen devices connected to a video game console or set-top box, or any other computing device that has a mobile network connection.

Figure 3:
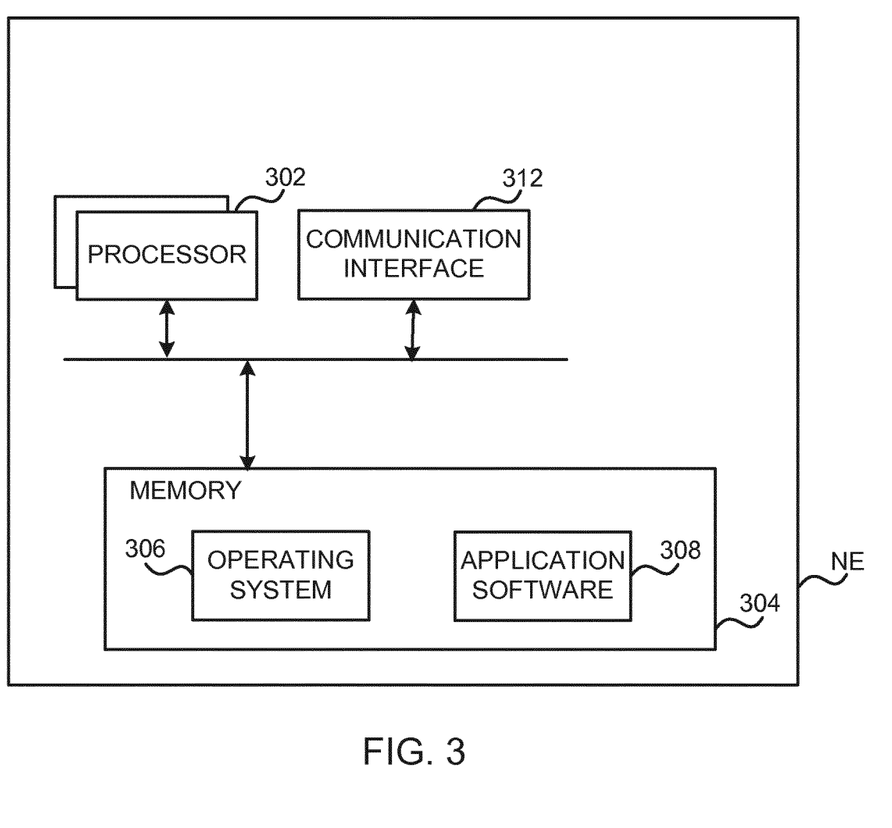
FIG. 3 is a block diagram of one illustrative example of the mobile network apparatus.

FIG. 3 illustrates an example of components of a mobile network apparatus, for example OSS apparatus or NE as in FIG. 1, and FIG. 2, which may be implemented by various forms of a computing and/or electronic device. The mobile network apparatus of FIG. 3 may act as the entity including at least part of the OSS configuration. The mobile network apparatus includes one or more processors 302 which may be microprocessors, controllers or any other suitable type of processors for processing computer executable instructions to control the operation of the apparatus. Platform software including an operating system 306 or any other suitable platform software may be provided at the apparatus to enable application software 308 to be executed on the device.

Computer executable instructions may be provided using any computer-readable media that is accessible by the apparatus. Computer-readable media may include, for example, computer storage media such as memory 304 and communications media. Computer storage media, such as memory 304, includes volatile and non-volatile, removable and non-removable media implemented in any method or technology for storage of information such as computer readable instructions, data structures, program modules or other data. In contrast, communication media may embody computer readable instructions, data structures, program modules, or other data in a modulated data signal, such as a carrier wave, or other transport mechanism. As defined herein, computer storage media does not include communication media. Therefore, a computer storage medium should not be interpreted to be a propagating signal per se. Propagated signals may be present in a computer storage media, but propagated signals per se are not examples of computer storage media. Although the computer storage media (memory 304) is shown within the apparatus it will be appreciated that the storage may be distributed or located remotely and accessed via a network or other communication link (e.g. using communication interface 312).

The term 'computer', 'computing-based device', 'apparatus' or 'mobile network apparatus' is used herein to refer to any device with processing capability such that it can execute instructions. Those skilled in the art will realize that such processing capabilities are incorporated into many different devices and therefore the terms 'computer' and 'computing-based device' each include PCs, servers, mobile telephones (including smart phones), tablet computers, set-top boxes, media players, games consoles, personal digital assistants and many other devices.

The methods and functionalities described herein may be performed by software in machine readable form on a tangible storage medium e.g. in the form of a computer program comprising computer program code means adapted to perform all the functions and the steps of any of the methods described herein when the program is run on a computer and where the computer program may be embodied on a computer readable medium. Examples of tangible storage media include computer storage devices comprising computer-readable media such as disks, thumb drives, memory etc. and do not include propagated signals. Propagated signals may be present in a tangible storage media, but propagated signals per se are not examples of tangible storage media. The software can be suitable for execution on a parallel processor or a serial processor such that the method steps may be carried out in any suitable order, or simultaneously.

This acknowledges that software can be a valuable, separately tradable commodity. It is intended to encompass software, which runs on or controls "dumb" or standard hardware, to carry out the desired functions. It is also intended to encompass software which "describes" or defines the configuration of hardware, such as HDL (hardware description language) software, as is used for designing silicon chips, or for configuring universal programmable chips, to carry out desired functions.

Those skilled in the art will realize that storage devices utilized to store program instructions can be distributed across a network. For example, a remote computer may store an example of the process described as software. A local or terminal computer may access the remote computer and download a part or all of the software to run the program. Alternatively, the local computer may download pieces of the software as needed, or execute some software instructions at the local terminal and some at the remote computer (or computer network). Alternatively, or in addition, the functionally described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

Any range or device value given herein may be extended or altered without losing the effect sought. Also any example may be combined to another example unless explicitly disallowed.

Although the subject matter has been described in language specific to structural features and/or acts, it is to be understood that the subject matter defined in the appended claims is not necessarily limited to the specific features or acts described above. Rather, the specific features and acts described above are disclosed as examples of implementing the claims and other equivalent features and acts are intended to be within the scope of the claims.

It will be understood that the benefits and advantages described above may relate to one embodiment or may relate to several embodiments. The embodiments are not limited to those that solve any or all of the stated problems or those that have any or all of the stated benefits and advantages. It will further be understood that reference to 'an' item refers to one or more of those items.

The steps of the methods described herein may be carried out in any suitable order, or simultaneously where appropriate. Additionally, individual blocks may be deleted from any of the methods without departing from the spirit and scope of the subject matter described herein. Aspects of any of the examples described above may be combined with aspects of any of the other examples described to form further examples without losing the effect sought.

The term 'comprising' is used herein to mean including the method, blocks or elements identified, but that such blocks or elements do not include an exclusive list and a method or apparatus may contain additional blocks or elements.

It will be understood that the above description is given by way of example only and that various modifications may be made by those skilled in the art. The above specification, examples and data provide a complete description of the structure and use of exemplary embodiments. Although various embodiments have been described above with a certain degree of particularity, or with reference to one or more individual embodiments, those skilled in the art could make numerous alterations to the disclosed embodiments without departing from the spirit or scope of this specification.

The invention claimed is:

1. A mobile network apparatus, comprising:
    at least one processor, and at least one memory storing program instructions that, when executed by the at least one processor, cause the apparatus to:
    request, by a coordination function of an operations support system, information relating to an operation of an uncoordinated function or an instance of an uncoordinated function and comprising a change origin having a self-organizing network function identification, wherein the uncoordinated function or the instance of the uncoordinated function is related to the coordination function;
    receive, by the coordination function, a response comprising the information; and
    based on the response, control, by the coordination function, the uncoordinated function or the instance of the uncoordinated function.

2. The mobile network apparatus of claim 1, wherein the information is at least partly configured to identify a function instance of the uncoordinated function.

3. The mobile network apparatus of claim 2, wherein the information comprises a change origin having entry identification.

4. The mobile network apparatus of claim 1, wherein the information is at least partly configured to indicate whether the uncoordinated function is enabled or disabled, and an operational state or phase of the uncoordinated function or the instance of the uncoordinated function.

5. The mobile network apparatus of claim 1, wherein the information is at least partly configured to indicate an impact area of the uncoordinated function or the instance of the uncoordinated function.

6. The mobile network apparatus of claim 1, wherein the information is at least partly configured to indicate an impact time of the uncoordinated function or the instance of the uncoordinated function.

7. The mobile network apparatus of claim 1, wherein the information comprises a configuration management operation, status information of the operation and a status of the function or the instance of the uncoordinated function.

8. The mobile network apparatus of claim 1, wherein the information is at least partly configured to be extracted from a configuration management plan.

9. The mobile network apparatus of claim 1, wherein the information is at least partly configured to be extracted from a configuration management activation record.

10. The mobile network apparatus of claim 1, wherein the information is at least partly configured to be extracted from a status of a function instance.

11. The mobile network apparatus of claim 1, wherein the uncoordinated function or the instance of the uncoordinated function is interacting with a configuration management history database.

12. The mobile network apparatus of claim 1, wherein the program instructions cause the apparatus to: request the information from a configuration management history database.

13. The mobile network apparatus of claim 12, wherein the configuration management history database is configured to detect that the information is missing.

14. The mobile network apparatus of claim 13,
wherein in case the configuartion management history database detects that the information is missing, the configuartion management history database is configured to request the information from the uncoordinated function or instance of the uncoordinated function; and
wherein the uncoordinated function or the instance of the uncoordinated function is configured to response the information to the configuartion management history database.

15. The mobile network apparatus of claim 14, wherein the further request is configured to be broadcasted or informed to a plurality of uncoordinated functions or the instance of the uncoordinated function.

16. The mobile network apparatus of claim 12, wherein the response does not include the information, and wherein the program instructions cause the apparatus to: send a further request to at least one uncoordinated function or the instance of the uncoordinated function requesting the information.

17. The mobile network apparatus of claim 1, wherein the request by the coordination function of the operations support system for the information is in response to a status of the uncoordinated function or the instance of the uncoordinated function that is missing in a corresponding activation record for a configuration management plan.

18. The mobile network apparatus of claim 1, wherein the information is at least partly configured to identify an operation of the uncoordinated function or the instance of the uncoordinated function.

19. A computer-readable storage medium comprising executable instructions for causing at least one processor of a mobile network apparatus to perform operations comprising:
request, by a coordination function of an operations support system, information relating to an operation of an uncoordinated function or an instance of an uncoordinated function and comprising a change origin having a self-organizing network function identification, wherein the uncoordinated function or the instance of the uncoordinated function is related to the coordination function;
receive, by the coordination function, a response comprising the information; and
based on the response, control, by the coordination function, the uncoordinated function or the instance of the uncoordinated function.

20. A method, comprising:
requesting, by a coordination function of an operations support system information relating to an operation of an uncoordinated function or an instance of an uncoordinated function and comprising a change origin having a self-organizing network function identification, wherein the uncoordinated function or the instance of the uncoordinated function is related to the coordination function;
receiving, by the coordination function, a response comprising the information; and
based on the response, controlling, by the coordination function, the uncoordinated function or the instance of the uncoordinated function.

* * * * *

UNITED STATES PATENT AND TRADEMARK OFFICE
CERTIFICATE OF CORRECTION

PATENT NO. : 10,667,121 B2
APPLICATION NO. : 15/542178
DATED : May 26, 2020
INVENTOR(S) : Haitao Tang and Kaj Peter Stenberg Page 1 of 1

It is certified that error appears in the above-identified patent and that said Letters Patent is hereby corrected as shown below:

In the Claims

In Claim 14:
Column 13, Line 13, "configuartion" should be deleted and --configuration-- should be inserted.
Column 13, Line 15, "configuartion" should be deleted and --configuration-- should be inserted.
Column 13, Line 20, "configuartion" should be deleted and --configuration-- should be inserted.

Signed and Sealed this
Fourth Day of August, 2020

Andrei Iancu
*Director of the United States Patent and Trademark Office*